(12) United States Patent
Hunze et al.

(10) Patent No.: US 11,577,467 B2
(45) Date of Patent: Feb. 14, 2023

(54) APPARATUS FOR ADDITIVELY MANUFACTURING THREE-DIMENSIONAL OBJECTS

(71) Applicant: Concept Laser GmbH, Lichtenfels (DE)

(72) Inventors: Stephan Hunze, Lichtenfels (DE); Jens Junge, Lichtenfels (DE); MariaTheresia Scherr, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 132 days.

(21) Appl. No.: 16/832,371

(22) Filed: Mar. 27, 2020

(65) Prior Publication Data
US 2020/0307104 A1 Oct. 1, 2020

(30) Foreign Application Priority Data
Mar. 27, 2019 (EP) ..................................... 19165600

(51) Int. Cl.
*B29C 67/00* (2017.01)
*B29C 64/393* (2017.01)
*B33Y 10/00* (2015.01)
*B33Y 30/00* (2015.01)
*B33Y 50/02* (2015.01)
*B29C 64/153* (2017.01)
(Continued)

(52) U.S. Cl.
CPC ............ *B29C 64/393* (2017.08); *B22F 10/20* (2021.01); *B29C 64/153* (2017.08); *B33Y 10/00* (2014.12); *B33Y 30/00* (2014.12); *B33Y 50/02* (2014.12); *B22F 10/30* (2021.01)

(58) Field of Classification Search
CPC ..... B29C 64/153; B29C 64/393; B33Y 10/00; B33Y 30/00; B33Y 50/00; B33Y 50/02
See application file for complete search history.

(56) References Cited

U.S. PATENT DOCUMENTS 11,045,876 B2 6/2021 Hoferer
2010/0125356 A1 5/2010 Shkolnik et al.
(Continued)

FOREIGN PATENT DOCUMENTS

EP 2186625 A2 5/2010
EP 2708348 A1 3/2014

OTHER PUBLICATIONS

European Search Report Corresponding to EP 191656008 dated Sep. 13, 2019.

*Primary Examiner* — Ryan M Ochylski
(74) *Attorney, Agent, or Firm* — Dority & Manning, P.A.

(57) ABSTRACT

An apparatus for additively manufacturing three-dimensional objects formed of successive layerwise consolidation of layers of a build material which can be consolidated by an energy beam. The apparatus may include a determination device confirmed to determine at least one parameter of the energy beam for a specific build material, wherein the determination device comprises at least one determination base body arrangeable or arranged in a beam guiding plane, in particular a build plane; and a tempering unit confirmed to temper the determination base body. Determination devices, along with methods, are also provided for determining at least one parameter of an energy beam of an apparatus for additively manufacturing three-dimensional objects.

19 Claims, 2 Drawing Sheets

(51) Int. Cl.
   *B22F 10/20*     (2021.01)
   *B22F 10/30*     (2021.01)

(56)           References Cited

U.S. PATENT DOCUMENTS

| | | |
|---|---|---|
| 2014/0079916 A1 | 3/2014 | Grebe et al. |
| 2017/0266759 A1* | 9/2017 | Fieret .................... B33Y 10/00 |
| 2018/0186067 A1 | 7/2018 | Buller et al. |
| 2019/0022943 A1* | 1/2019 | Schödel ................ B33Y 30/00 |
| 2019/0022949 A1* | 1/2019 | Herzog ................. B33Y 50/02 |
| 2019/0111625 A1* | 4/2019 | Bechmann ............ B29C 64/364 |
| 2019/0184642 A1* | 6/2019 | Schmidbauer ........ B29C 64/264 |
| 2020/0070424 A1* | 3/2020 | Hunze ................... B29C 64/153 |
| 2020/0086570 A1* | 3/2020 | Kremer ................ B29C 64/153 |
| 2020/0140706 A1* | 5/2020 | Pfister .................... C08L 71/00 |
| 2020/0156319 A1* | 5/2020 | Döhler ................. B29C 64/264 |
| 2020/0307103 A1* | 10/2020 | Junge .................... B33Y 40/00 |

\* cited by examiner

APPARATUS FOR ADDITIVELY MANUFACTURING THREE-DIMENSIONAL OBJECTS

PRIORITY INFORMATION

The present application claims priority to European Patent Application Serial Number 19165600.8 filed on Mar. 27, 2019.

FIELD OF TECHNOLOGY

The present disclosure generally relates to an apparatus for additively manufacturing three-dimensional objects by means of successive layerwise selective irradiation and consolidation of layers of a build material which can be consolidated by means of an energy beam, which apparatus comprises a determination device adapted to determine at least one parameter of the energy beam, wherein the determination device comprises at least one determination base body arrangeable or arranged in a beam guiding plane, in particular a build plane.

BACKGROUND

Apparatuses for additively manufacturing three-dimensional objects are generally known from prior art. Typically, a determination device is used for determining one or more parameters of an energy beam, for example a focal position of the energy beam, an intensity of the energy beam and a shape of a spot of the energy beam, e.g. in a build plane. The determination of the parameter of the energy beam is crucial for object quality and/or process quality, since deviations from a nominal parameter lead to deviations in the irradiation process, e.g. resulting in depositing less or too much energy in a corresponding region of the build plane.

Further, it is known from prior art that determination devices can be used that involve determination base bodies being arranged in a beam guiding plane, e.g. the build plane in which the build material will be arranged to be irradiated in the additive manufacturing process. In other words, a determination base body, typically a metal plate, can be arranged in the beam guiding plane or in the build plane in which in the additive manufacturing process the build plane will be arranged. Thus, it is possible to guide the energy beam in advance to an additive manufacturing process onto the determination base body that is arranged in the same plane in which the build material will be arranged in the succeeding additive manufacturing process, e.g. succeeding a determination process performed on the apparatus for determining the parameter of the energy beam.

Thus, the energy beam is guided onto the determination base body for determining the at least one parameter of the energy beam, e.g. determining the intensity or the spot diameter or shape or the position of the energy beam, for instance. However, the determined parameters of the energy beam may still deviate from the parameter of the energy beam in the additive manufacturing process, as the surface of the determination base body may deviate from the surface of build material arranged in the build plane. For example, the surface of the determination base body may heat up due to the irradiation and therefore, the intensity distribution determined via the determination device is falsified.

BRIEF DESCRIPTION

Aspects and advantages will be set forth in part in the following description, or may be obvious from the description, or may be learned through practice of the invention.

An apparatus is generally provided for additively manufacturing three-dimensional objects formed of successive layerwise consolidation of layers of a build material which can be consolidated by an energy beam. In one embodiment, the apparatus includes a determination device confirmed to determine at least one parameter of the energy beam for a specific build material, wherein the determination device comprises at least one determination base body arrangeable or arranged in a beam guiding plane, in particular a build plane; and a tempering unit confirmed to temper the determination base body.

Determination devices for apparatus for additive manufacturing three-dimensional objects are also generally provided, along with methods for determining at least one parameter of an energy beam of an apparatus for additively manufacturing three-dimensional objects.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
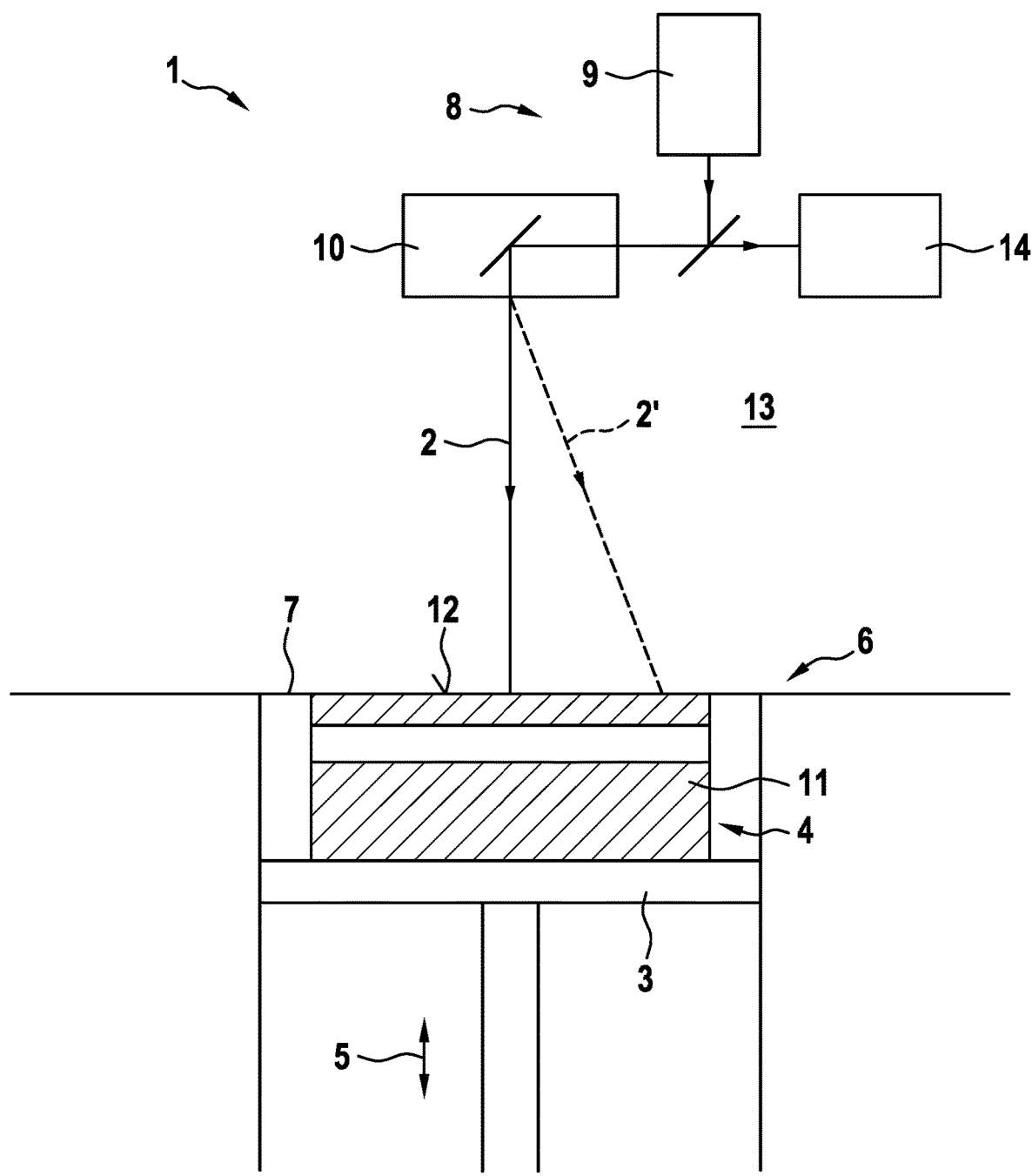
FIG. 1 shows an apparatus with a determination device.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An improved apparatus for additively manufacturing three-dimensional objects is generally provided. In one embodiment, a more process-oriented determination of at least one parameter of the energy beam can be performed. For example, the apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, embodiments of the present invention generally relate to an apparatus for additively manufacturing three-dimensional objects, which apparatus comprises a determination device for determining at least one parameter of the energy beam used in the additive manufacturing process for irradiating and thereby, consolidating a specific build material which is used in the additive manufacturing process. The term "specific build material" in the scope of this application relates to a build material, particularly a powdery metal material, which can be used in the additive manufacturing process to build the three-dimensional object.

When preparing the apparatus for performing a specific build job, the corresponding build material which is specific for the prepared build job, is provided, e.g. loaded in corresponding units of the apparatus such as dose units. In other words, in advance to performing the additive manufacturing process on the apparatus, it is defined which specific build material has to be used or will be used, respectively. For example, in one build job, a build material comprising titanium and in another build job, a build material comprising aluminum may be used. In general the build materials used in two manufacturing processes may differ in at least one component. Thus, for the first build job the build material comprising titanium can be defined as a specific build material, whereas for the other build job, the build material comprising aluminum is the specific build material.

According to embodiments of the present invention, a tempering unit is provided, in particular a cooling unit, which is adapted to temper the determination base body. Via the tempering unit it is possible to control the temperature of the determination base body, e.g. adjust a defined temperature of the determination base body. Particularly, cooling the determination base body as much as possible, e.g. to compensate an increase of the temperature caused by the irradiation of the determination base body via the energy beam. Thus, the conditions under which the energy beam can irradiate the determination base body can be kept stable, as the energy that is deposited in the determination base body via the energy beam, can be dissipated via the tempering unit, e.g. guided away from the determination base body. For example, heat induced via the irradiation with the energy beam, can be dissipated via the tempering unit. Thus, the surface of the determination base body can be kept on a stable temperature, e.g. allowing for stabilizing an intensity distribution which can be captured via a thermal camera.

The tempering unit may, inter alia, be adapted to generate a fluid stream streaming along the surface of the determination base body. As fluid, any arbitrary gas or liquid may be used, wherein, for example, an inert gas, such as argon can be used to stream alongside the surface of the determination base body and thereby, temper the surface of the determination base body. The fluid stream may be generated above the surface of the determination base body, e.g. along the side of the surface facing the beam guiding unit, and/or beneath the surface of the determination base body. Streaming parameters of the fluid stream may be adjusted accordingly to ensure that the heat induced via the energy beam can be dissipated sufficiently to avoid negative effects on the determination process.

The tempering unit may further be adapted to generate the fluid stream through the determination base body, in particular streaming beneath the surface. In other words, additionally or alternatively to generating a fluid stream streaming above the surface of the determination base body or beneath the determination base body, it is possible to generate a fluid stream that streams through the determination base body. For example, at least one channel or other guiding structure may be provided through which the fluid may stream through the determination base body. The guiding structure through which the fluid may stream through the determination base body can, inter alia, be arranged as close to the surface is possible, e.g. directly beneath the surface of the determination base body.

The tempering unit may be adapted to generate a defined heat flow, in particular a unidirectional heat flow. By generating a defined, particularly unidirectional, heat flow it is assured that the intensity distribution caused by the energy beam can be determined properly, as the energy input caused by the energy beam irradiating the surface of the determination base body does not cause adjacent regions to heat up. Heating of adjacent regions which are located neighboring the current position of the spot of the energy beam is reduced or entirely avoided, as the heat can be dissipated due to the heat flow in a defined direction, e.g. perpendicular to the surface of the determination base body.

In other words, the heat may preferably flow from the surface of the determination base body towards the fluid stream generated via the tempering unit. Thus, it is possible to avoid that the spot of the energy beam extends in the surface of the determination base body due to heating up of adjacent regions. Instead, the heat can be dissipated and transported away via the fluid stream in that the spot of the energy beam that is generated on the surface of the determination base body remains stable and can be captured via the determination unit properly.

Thus, the tempering unit may be adapted to control, in particular stabilize, the intensity distribution of the energy beam on the surface of the determination base body. As described before, by cooling the surface of the determination base body, it is possible that the energy beam that is incident on the surface of the determination base body does not significantly heat regions neighboring the current position of the spot of the energy beam. Therefore, a stable intensity distribution is generated via the spot of the energy beam on the surface of the determination base body that does not change due to heating effects, in particular due to heat dissipating in the surface of the determination base body, e.g. parallel to the surface.

According to an embodiment of the inventive apparatus, the determination device may comprise a determination unit, in particular a thermal camera, adapted to determine at least one beam parameter of the energy beam guided onto the determination base body. Via the determination unit it is possible to determine the at least one parameter of the energy beam, e.g. by capturing an image of an intensity distribution generated via the energy beam on the surface of the determination base body. For example, the determination unit can be built as or comprise at least one camera, e.g. a thermal camera. By using the determination unit it is possible to determine the intensity of the energy beam and/or the intensity distribution that is generated in the beam guiding plane, e.g. the spot diameter of the energy beam or the shape of the spot of the energy beam and the intensity distribution across the spot, for instance. Particularly, it is possible to use a determination unit that is provided with the apparatus, e.g. for determining parameters of the irradiation process during the additive manufacturing process.

The determination unit may be arranged essentially perpendicular to the surface of the determination base body. Thus, it is possible to capture images of the surface of the determination base body with the determination unit being arranged perpendicular to the surface of the determination base body. In other words, it is possible to capture images of the energy beam being incident on the determination base body so as to facilitate the determination process.

The determination unit may further be adapted to, in particular directly, determine an intensity distribution of the energy beam on the determination base body. As described before, the energy beam may be guided onto the surface of the determination base body, wherein the energy beam generates a spot on the determination base body. The spot of the energy beam on the determination base body represents the spot of the energy beam on the surface of build material in the additive manufacturing process. Therefore, it is possible to determine the intensity distribution of the energy beam, e.g. the spot diameter, the spot shape and the distribution of the intensity of the energy beam across the spot. Therefore, it is, inter alia, possible to determine whether the energy beam generates a desired intensity distribution in the beam guiding plane or whether deviations from a nominal intensity distribution occur that have to be corrected.

Further, the determination unit may be adapted to, in particular directly, determine an angle dependency of the intensity distribution of the energy beam on the determination base body. For example, the intensity distribution generated via the energy beam in the beam guiding plane depends on the angle under which the energy beam is incident in the beam guiding plane. Thus, a desired intensity distribution generated with the energy beam being incident essentially perpendicular on the build plane will be distorted dependent on the angle under which the energy beam is incident in the beam guiding plane, e.g. by deflecting the energy beam or guiding the energy beam to areas of the beam guiding plane deviant from the central area of the beam guiding plane, e.g. corners or areas near an edge of the beam guiding plane. For example, a circular or annular intensity distribution can be distorted to an elliptical distribution dependent on the angle or the position of the energy beam in the beam guiding plane. As the determination base body closely resembles the structure of the surface of build material used in the additive manufacturing process, the same reaction of the energy beam, in particular the same dependency of the intensity distribution from the angle under which the energy beam is incident in the beam guiding plane, can be determined and the parameter of the energy beam or other process parameters can be adjusted accordingly.

According to an embodiment of the apparatus, at least one surface parameter of the surface of the determination body may be defined dependent on a surface parameter of a specific build material arrangeable or arranged in a build plane in an additive manufacturing process performed on the apparatus. Therefore, it is possible to take the surface parameter of the specific build material into calculation when the determination body is used to determine the at least one parameter of the energy beam. In other words, a specific surface of the determination base body can be provided, e.g. formed or built, that represents the surface of the specific build material that will be used in the succeeding additive manufacturing process. Thus, it is possible to closely represent the surface of build material via the surface of the determination base body, on which surface of build material the energy beam will be incident on a during the additive manufacturing process.

In particular, the surface of the determination base body will (closely) "imitate" the surface of build material that is arranged in the additive manufacturing process, wherein a reproduction of the properties of the surface of build material is possible. Hence, the determination of the parameter of the energy beam will be more process-oriented and more realistic, as the surface of the determination base body is more similar or even identical to the surface of build material that is used in the additive manufacturing process. Therefore, the energy beam incident on the surface of the determination base body will show the same or at least similar parameters, e.g. intensity, spot shape, reflection or absorption behavior and the like as the energy beam being incident on the surface of build material. Hence, it is possible to take the specific build material that is used in the actual additive manufacturing process into calculation when the parameter of the energy beam is determined.

The surface parameter may therefore, be chosen or defined in that the surface of build material in a real additive manufacturing process may be imitated by the surface of the determination base body. Hence, the surface of the determination base body is defined or built as similar to a surface of build material as possible, in particular identical. For example, the surface of the determination base body may be defined dependent on a particle size and/or a particle size distribution of a build material and/or a type of build material, e.g. steel, aluminum or titanium, and/or dependent on the actual additive manufacturing process. Thus, the variation in the surface between two processes, e.g. using different build materials or different sizes of build material particles, can be taken into calculation. The surface roughness may, for example, be defined to represent a surface of build material with a particle size of approximately 50 μm.

The surface parameter may be or may relate to a chemical and/or physical and/or mechanical parameter of the surface of the determination base body, in particular a surface roughness and/or a material parameter and/or an optical parameter. In other words, the surface parameter may relate to any arbitrary parameter of the specific build material used in the additive manufacturing process. In particular, it is possible to resemble or replicate the properties of the build material used in the additive manufacturing process as closely as possible to determine the parameter of the energy beam in the determination process as close to reality as possible. Particularly, a particle size of the build material may be taken into calculation by correspondingly preparing the surface of the calibration base body, e.g. with a defined surface roughness. Further, the absorption behavior and/or a reflectivity of the surface of build material used in the additive manufacturing process can be taken into calculation. Of course, the type of build material can be considered as well, for example if aluminum is used as build material, the calibration base body may be built from aluminum or at least the surface of the calibration base body may be built from aluminum.

Besides, it is not necessary that the entire calibration base body comprises the same chemical and/or physical and/or mechanical parameters as the build material used in the process, but it is also possible to only provide a surface of the determination base body with the corresponding chemical and/or physical and/or mechanical parameters. Further, it is possible to provide a variety of calibration base bodies, wherein the corresponding calibration base body can be selected dependent on the specific build material that is to be used in the additive manufacturing process.

According to another embodiment of the inventive apparatus, the determination device may be adapted to generate a spatially resolved map of the intensity distribution of the energy beam, in particular with respect to the angle of incidence. In other words, it is possible to generate a map of the beam guiding plane in which the energy beam can be guided. For each position of the energy beam in the beam guiding plane an intensity distribution can be captured, wherein it is possible to spatially resolve the dependence of the intensity distribution of the energy beam on the position of the energy beam in the beam guiding plane. In other words, it is possible to resolve how the intensity distribution of the energy beam, e.g. the spot shape of the energy beam, changes between different positions of the energy beam in the beam guiding plane. Particularly, it is possible to resolve the angle dependency of the energy beam.

Hence, it is also possible that the determination device is adapted to generate at least one correction value for at least one process parameter, in particular an irradiation parameter, based on the determined intensity distribution for at least one position of the energy beam. As described before, it is possible that, e.g. due to the angle dependency, the intensity distribution generated via the energy beam in the beam guiding plane differs between at least two positions. Thus, it is possible to generate a correction value for at least one process parameter, e.g. for the focal position, the intensity distribution, the shape of the spot and the like in order to correct the deviations of the intensity distribution of the energy beam between those positions to assure that the energy beam generates a defined intensity distribution in each position of the build plane.

Besides, the embodiments of the present invention generally relate to a determination device for an apparatus for additively manufacturing three-dimensional objects, which determination device is adapted to determine at least one parameter of an energy beam of the apparatus, wherein the determination device comprises at least one determination base body arrangeable or arranged in a beam guiding plane, in particular a build plane, wherein at least one surface parameter of the surface of the determination body is defined dependent on a surface parameter of a specific build material arranged in a build plane in an additive manufacturing process performed on the apparatus.

Further, the embodiments of the present invention generally relate to a method for determining at least one parameter of an energy beam of an apparatus for additively manufacturing three-dimensional objects, wherein at least one determination base body is arranged in a beam guiding plane, in particular a build plane, wherein at least one surface parameter of the surface of the determination body is defined or selected dependent on a surface parameter of build material arranged in a build plane in an additive manufacturing process performed on the apparatus and determining at least one parameter of the energy beam guided on the surface of the determination base body.

Self-evidently, all details, features and advantages described with respect to the inventive apparatus are fully transferable to the inventive determination device and the inventive method. Of course, the inventive method may be performed on the inventive apparatus.

Figure 2:
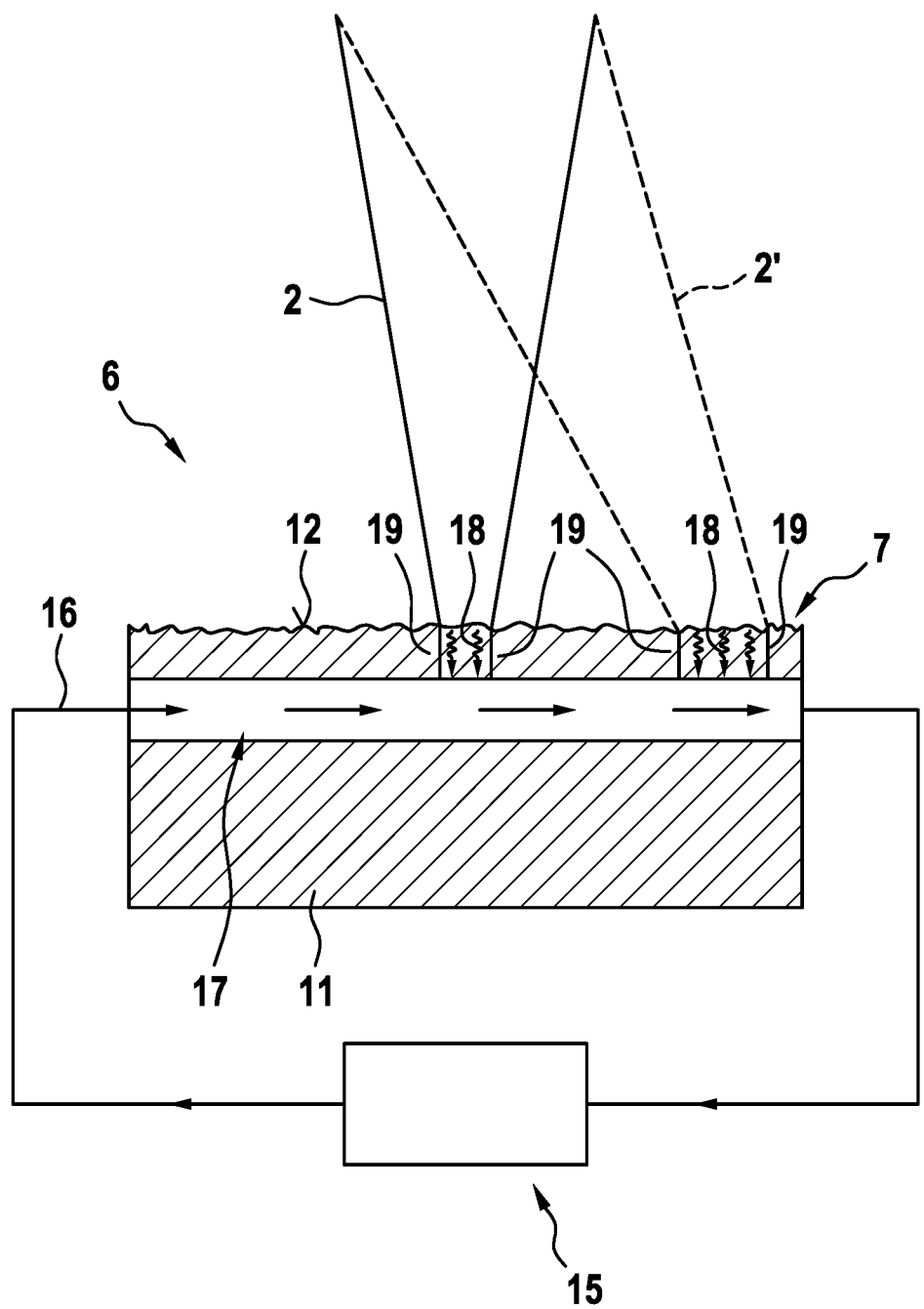
FIG. 2 shows a determination base body of the determination device from FIG. 1.

Exemplary embodiments of the invention are described with reference to the Fig. The Fig. are schematic diagrams where FIG. 1 shows an apparatus with a determination device; and FIG. 2 shows a determination base body of the determination device from FIG. 1.

FIG. 1 shows an apparatus 1 for additively manufacturing three-dimensional objects by means of successive layerwise selective irradiation and consolidation of layers of a build material which can be consolidated by means of an energy beam 2. In the situation depicted in FIG. 1, the apparatus 1 performs a determination process in which a parameter of the energy beam 2 can be determined. In other words, in the determination process, no build material is arranged on a carrying unit 3 which is height-adjustably movable in a build chamber 4, as indicated via arrow 5, or limits a build chamber 4 bottom sides, respectively.

In the situation depicted in FIG. 1, a determination device 6 is provided that can be arranged in a beam guiding plane 7, e.g. the same plane in which build material may be arranged to be irradiated via the energy beam 2 in a regular mode of operation of the apparatus 1. For guiding the energy beam 2 across the beam guiding plane 7, the apparatus 1 comprises an irradiation device 8, wherein in this exemplary embodiment the irradiation device 8 comprises a beam source 9, e.g. a laser source, and a beam guiding unit 10, e.g. an x- and y-scanner.

The determination device 6 comprises a determination base body 11 with a surface 12 facing the process chamber 13, e.g. facing the beam guiding unit 10. In other words, the surface 12 of the determination base body 11 may be arranged in the beam guiding plane 7 for guiding the energy beam 2 onto the surface 12. The surface 12 comprises a surface parameter or surface parameters that are defined dependent on the surface parameter of the specific build material that is used in the succeeding additive manufacturing process performed on the apparatus 1. In this exemplary embodiment, the surface parameter relates to a mechanical parameter and/or a physical parameter and/or or a chemical parameter. In particular, the surface 12 of the determination base body 11 can be built from the same type of material, e.g. aluminum or titanium, with the same surface roughness, e.g. dependent on a particle size of the specific powdery build material used in the manufacturing process, and with the same optical parameters, such as an absorption behavior or a reflectivity of the surface 12.

Further, a determination unit 14 is assigned to the determination device 6, wherein radiation emitted from the surface 12 can follow the same beam path as the energy beam 2 and therefore, can be captured via the determination unit 14. Alternatively, it is also possible to arrange the determination unit 14 perpendicular to the surface 12, particularly above the surface 12. The determination unit 14 may comprise a camera, particularly a thermal camera, that can record or capture the spot of the energy beam 2 on the surface 12. In other words, an intensity distribution that is generated via the spot of the energy beam 2 on the surface 12 can be captured, wherein the energy beam 2 can be guided to several positions on the surface 12 to determine the at least one parameter of the energy beam 2 in the corresponding positions.

For example, the determination unit 14 may be adapted to generate a spatially resolved map of the energy beam 2 in the corresponding positions on the surface 12. For example, an angle dependency between the energy beam 2 being guided to a first position on the surface 12 and the energy beam 2' being guided to a second position on the surface 12, can be determined. For example, dependent on the angle of incidence the spot of the energy beam 2' on the surface 12 may distort compared to the intensity distribution of the spot of the energy beam 2. In a perpendicular incidence the energy beam 2 may generate a spot with a circular or annular energy distribution, whereas by guiding the energy beam 2' to an edge or a corner part of the, e.g. cuboid or cylindrical, determination base body 11, the intensity distribution may be distorted to an elliptical distribution.

FIG. 2 depicts the determination base body 11 of the determination device 6 in a detailed view, wherein the surface roughness of the surface 12 of the determination base body 11 is schematically depicted, e.g. reproducing the surface roughness of powdery build material, particularly based on the particle size and shape. Thus, the surface 12 represents the surface of build material, e.g. powdery build material, arranged in the beam guiding plane 7 in a regular mode of operation. The determination device 6 according to this exemplary embodiment comprises a tempering unit 15 that is adapted to generate a fluid stream 16 streaming along the surface 12 of the determination base body 11. In this embodiment, the tempering unit 15 is adapted to generate a fluid stream 16, e.g. a liquid stream or a gas stream, through a channel 17 in the determination base body 11. The channel 17 is arranged beneath the surface 12 of the determination base body 11 and is adapted to temper, in particular cool, the surface 12 from beneath. Of course, a plurality of channels 17 may be provided or a common channel may be provided that is adapted to cool the surface 12.

The tempering unit 15 therefore, is adapted to generate a defined heat flow, in particular a unidirectional heat flow, as indicated via arrows 18, wherein the heat that is deposited via the energy beam 2, 2' in the surface 12 is dissipated via the fluid stream 16. In other words, the surface 12 may be excessively cooled in that the heat that is deposited via the irradiation with the energy beam 2, 2' can be dissipated and therefore, the heat is transported in one direction from the surface 12 to the fluid stream 16. Thus, the intensity distribution generated in the spot of the energy beam 2, 2' can be stabilized, as the heat flow is limited to a direction perpendicular to the surface 12. Therefore, regions 19 adjacent to the current position of the spot of the energy beam 2, 2', e.g. adjacent to the intensity distribution generated via the energy beam 2, 2', are not heated due to the irradiation or the heating of those regions 19 is at least minimized. Therefore, it is possible to generate a stable intensity distribution that can be captured via the determination unit 14, which intensity distribution particularly does not change over time due to heating effects. In other words, a change of the intensity distribution is caused by a change of a parameter of the energy beam 2, 2' and not caused by a heating effect.

The determination device 6 further is adapted to generate at least one correction value for correcting at least one process parameter, e.g. an irradiation parameter based on which the energy beam 2, 2' are generated and/or guided. For example, an elliptical behavior of the spot of the energy beam 2, 2' resulting from a specific angle of incidence can be compensated accordingly. Self-evidently, after the determination process has been finished and the relevant parameters of the energy beam 2, 2' have been determined, the determination device 6, in particular the determination base body 11 may be removed from the build chamber 4 and build material may be inserted into the build chamber 4 to be selectively irradiated via the energy beam 2, 2' to form a three-dimensional object. As the parameter of the energy beam 2, 2' has been determined via the determination device 6 that closely resembles the surface of build material via the surface 12 of the determination device 11, the adjustment of the parameter of the irradiation beam, e.g. irradiation parameters used in the additive manufacturing process, are closer to reality than using a determination base body 11 with an arbitrary other surface, e.g. with a deviant surface structure and/or built from a deviant material.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for additively manufacturing three-dimensional objects formed of successive layerwise consolidation of layers of a build material which can be consolidated by an energy beam, the apparatus comprising:
    a determination device configured to determine at least one parameter of the energy beam for a specific build material, wherein the determination device comprises
        at least one determination base body comprising a surface arrangeable or arranged in a beam guiding plane, the surface comprising at least one surface parameter, the at least one surface parameter dependent on at least one surface parameter of the specific build material;
    a tempering unit configured to temper the at least one determination base body by adjusting a defined temperature of the at least one determination base body; and
    a determination unit comprising a camera configured to determine the at least one parameter of the energy beam guided onto the at least one determination base body via directly determining an intensity distribution of the energy beam on the at least one determination base body.

2. The apparatus of claim 1, wherein the tempering unit comprises a cooling unit.

3. The apparatus of claim 1, wherein the tempering unit is configured to generate a fluid stream streaming along the surface of the at least one determination base body.

4. The apparatus of claim 3, wherein the tempering unit is configured to generate the fluid stream through the at least one determination base body by streaming beneath the surface.

5. The apparatus of claim 1, wherein the tempering unit is configured to generate a defined heat flow.

6. The apparatus of claim 5, wherein the tempering unit is configured to generate a unidirectional heat flow.

7. The apparatus of claim 5, wherein the tempering unit is configured to stabilize the intensity distribution of the energy beam on the surface of the at least one determination base body.

8. The apparatus of claim 1, wherein the surface of the determination base body and the specific build material comprise like optical parameters.

9. The apparatus of claim 1, wherein the camera of the determination unit comprises a thermal camera, the thermal camera captures an image of the intensity distribution of the energy beam on the at least one determination base body.

10. The apparatus of claim 9, wherein the determination unit is arranged essentially perpendicular to the surface of the at least one determination base body.

11. The apparatus of claim 10, wherein the thermal camera captures images of the energy beam incident on the at least one determination base body.

12. The apparatus of claim 10, wherein the determination unit is configured to determine an angle dependency of the intensity distribution of the energy beam on the at least one determination base body.

13. The apparatus of claim 1, wherein the at least one surface parameter is a material parameter.

14. The apparatus of claim 1, wherein the at least one surface parameter is or relates to a chemical and/or a physical and/or a mechanical parameter of the surface of the at least one determination base body.

15. The apparatus of claim 14, wherein the at least one surface parameter comprises at least one of a surface roughness, a material parameter, and an optical parameter.

16. The apparatus of claim 1, wherein the determination device is configured to generate a spatially resolved map of the intensity distribution of the energy beam.

17. The apparatus of claim 1, wherein the determination device is configured to generate at least one correction value for at least one process parameter based on a determined intensity distribution for at least one position of the energy beam.

18. A determination device for an apparatus for additively manufacturing three-dimensional objects, the determination device comprising:
   at least one determination base body comprising a surface arrangeable or arranged in a beam guiding plane, the surface comprising at least one surface parameter, the at least one surface parameter dependent on at least one surface parameter of a specific build material;
   a tempering unit configured to temper the at least one determination base body by adjusting a defined temperature of the at least one determination base body; and
   a determination unit comprising a camera configured to determine at least one parameter of an energy beam guided onto the at least one determination base body via directly determining an intensity distribution of the energy beam on the at least one determination base body.

19. The determining device of claim 18, wherein the at least one parameter comprises an intensity of the energy beam or the intensity distribution of the energy beam in a build plane of the beam guiding plane.

* * * * *